United States Patent
Willig

(10) Patent No.: US 6,624,835 B2
(45) Date of Patent: Sep. 23, 2003

(54) SYSTEM AND METHOD FOR NOISE REDUCTION IN TOUCH SCREEN SYSTEM

(75) Inventor: Randy C. Willig, Fort Collins, CO (US)

(73) Assignee: National Semiconductor Corporation, Santa Clara, CA (US)

(*) Notice: Subject to any disclaimer, the term of this patent is extended or adjusted under 35 U.S.C. 154(b) by 166 days.

(21) Appl. No.: 09/757,739

(22) Filed: Jan. 9, 2001

(65) Prior Publication Data
US 2002/0089491 A1 Jul. 11, 2002

(51) Int. Cl.[7] .................................................. G09G 5/00
(52) U.S. Cl. ................... 347/173; 345/179; 178/19.01; 178/20.01
(58) Field of Search ..................... 345/173, 98, 174, 345/179; 178/19.01, 19.02, 19.03, 20.01

(56) References Cited

U.S. PATENT DOCUMENTS

| 4,707,845 | A | * | 11/1987 | Krein et al. ................. 708/313 |
| 5,041,865 | A | * | 8/1991 | Asano et al. ................ 355/30 |
| 5,053,757 | A | * | 10/1991 | Meadows ..................... 345/173 |
| 6,236,386 | B1 | * | 5/2001 | Watanabe ..................... 345/98 |

* cited by examiner

Primary Examiner—Steven Saras
Assistant Examiner—Fritz Alphonse

(57) ABSTRACT

There is disclosed a system and method for noise reduction in touch screen systems. A touch screen system comprises an analog to digital converter capable of converting to digital signals analog signals from at least one analog resistive film in a touch screen. The analog signal is indicative of a location on the touch screen. The invention comprises an apparatus for reducing noise in a touch screen comprising a microcontroller coupled to said analog to digital converter. The microcontroller receives a synchronization trigger signal, and in response to receiving the synchronization trigger signal, waits to receive digital signals from the analog to digital converter until the expiration of a period of time in which noise associated with the synchronization trigger signal has occurred. A method for reducing common mode noise is disclosed that actively senses and removes the ground return offset from the analog signals of the touch screen. Common mode noise is reduced by removing common mode noise from touch screen data signals by holding the touch screen data signals in a sample and hold circuit.

30 Claims, 8 Drawing Sheets

SYSTEM AND METHOD FOR NOISE REDUCTION IN TOUCH SCREEN SYSTEM

TECHNICAL FIELD OF THE INVENTION

The present invention is generally directed to systems and methods for reducing noise in touch screen systems and, more specifically, to a system and method for reducing noise in a touch screen by synchronously triggering a microcontroller to record touch screen location data signals after the expiration of a period of time in which noise occurs.

BACKGROUND OF THE INVENTION

A touch screen system is a computer input system capable of receiving input signals for a computer through a pressure sensitive plate. When an input stylus, or a pen, or a finger touches the pressure sensitive plate (the "touch screen") at a point on the surface of the touch screen, the touch screen system senses the location of the "touch point" within the area of the touch screen. The touch screen system sends information concerning the location of the "touch point" to a computer.

The computer is programmed to associate specific locations on the touch screen with certain predetermined input signals. For example, touching one area of the touch screen may instruct the computer to perform a certain function and touching another area of the touch screen may instruct the computer to perform another function.

A touch screen system is usually used in conjunction with a video display device. The touch screen is made of transparent material. When the touch screen is placed over a video display device, images from the video display device are visible through the touch screen. The computer displays images on the video display device that identify various instructions or input signals that the computer will receive when the areas of the touch screen associated with those images are touched.

Touch screen systems may be used in conjunction with a wide variety of video display devices. Touch screens may be used on large size video display units such as those used in cash register displays in restaurants or other retail establishments. Touch screens may also be used on small size video display units such as those used in hand-held personal digital assistants. The small size video display devices that are most commonly used with touch screen systems are liquid crystal display devices.

One well known type of touch screen system uses an "analog resistive" touch screen. In an analog resistive touch screen, a voltage is applied across a resistor network that underlies the touch screen. The resistance of the resistor network changes when the touch screen is touched. An identifiable voltage change may be detected as each individual "touch point" is touched. The touch screen system measures the change in resistance of the resistor network in order to determine the location of "touch point" on the touch screen that is being touched.

The performance of analog resistive touch screens suffers from errors due to noise. Noise on an analog resistive touch screen may be introduced from a variety of sources. One external noise source is the Liquid crystal display itself. As a liquid crystal display operates, it generates a certain amount of noise. This noise is coupled to the touch screen that overlays the liquid crystal display. Another external noise source is the backlight inverter that is used to illuminate the liquid crystal display.

One prior art approach for reducing noise in a large size touch screen involves placing a relatively thick piece of glass between the liquid crystal display and the touch screen. Because the amplitude of the noise signal decreases as the square of the distance from the noise source, increasing the distance of the touch screen from the liquid crystal display reduces the effect of the noise on the touch screen. The glass is used to keep the touch screen a fixed distance from the liquid crystal display. Alternatively, an air gap may be used to accomplish the same result. The relative thickness required for the glass (or the air gap) makes this approach impractical for small size touch screens. It is noted that this approach does nothing to reduce the noise level at the source of the noise.

Another prior art approach for reducing noise involves using a specially treated layer of glass between the touch screen and the liquid crystal display. The layer of glass is coated with a conductive material to provide electromagnetic shielding to reduce noise. The coating, however, reduces the amount of light that is transmitted to the touch screen. This approach also suffers from the disadvantage that it is relatively expensive.

Another prior art approach for reducing noise in touch screens involves adding noise filter capacitors to the sense lines of the touch screen. However, there are several problems with this approach. The noise reduction process is slow (i.e., it does not reduce noise sufficiently quickly), it increases power consumption, and it increases the time required for a signal to stabilize or "settle" to a particular value. In addition, the noise filter capacitors themselves also introduce some error.

There is therefore a need in the art for an improved system and method for reducing noise in touch screen systems.

SUMMARY OF THE INVENTION

To address the above-discussed deficiencies of the prior art, it is a primary object of the present invention to provide an improved system and method for reducing noise in touch screen systems.

A touch screen system comprises an analog to digital converter capable of converting to digital signals analog signals from at least one analog resistive film in a touch screen. The analog signal is indicative of a location on the touch screen. The present invention comprises a system and method for reducing noise in a touch screen system comprising a microcontroller coupled to the analog to digital converter. The microcontroller receives a synchronization trigger signal, and in response to receiving the synchronization trigger signal, waits to receive digital signals from the analog to digital converter until the expiration of a period of time in which noise associated with the synchronization trigger signal has occurred.

The present invention also comprises a method for reducing common mode noise on the touch screen by actively sensing and removing the ground return offset from the touch screen data signals. An alternate method for reducing common mode noise comprises removing common mode noise from touch screen data signals by holding the touch screen data signals in a sample and hold circuit.

It is a primary object of the invention to provide a system and method for reducing noise in touch screen systems.

It is also an object of the invention to provide a system and method for reducing common mode noise in touch screen systems.

It is another object of the invention to provide a microcontroller capable of receiving a synchronization trigger signal, and in response to receiving the synchronization trigger signal, capable of waiting to receive touch screen data signals until the expiration of a period of time in which noise occurs.

It is yet another object of the invention to provide a system and method capable of reducing touch screen noise from a noise level of plus or minus ten pixels to a noise level no greater than plus or minus one pixel.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION OR THE INVENTION

FIGS. 1 through 9, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged system for reducing noise in touch screen systems.

Figure 1:
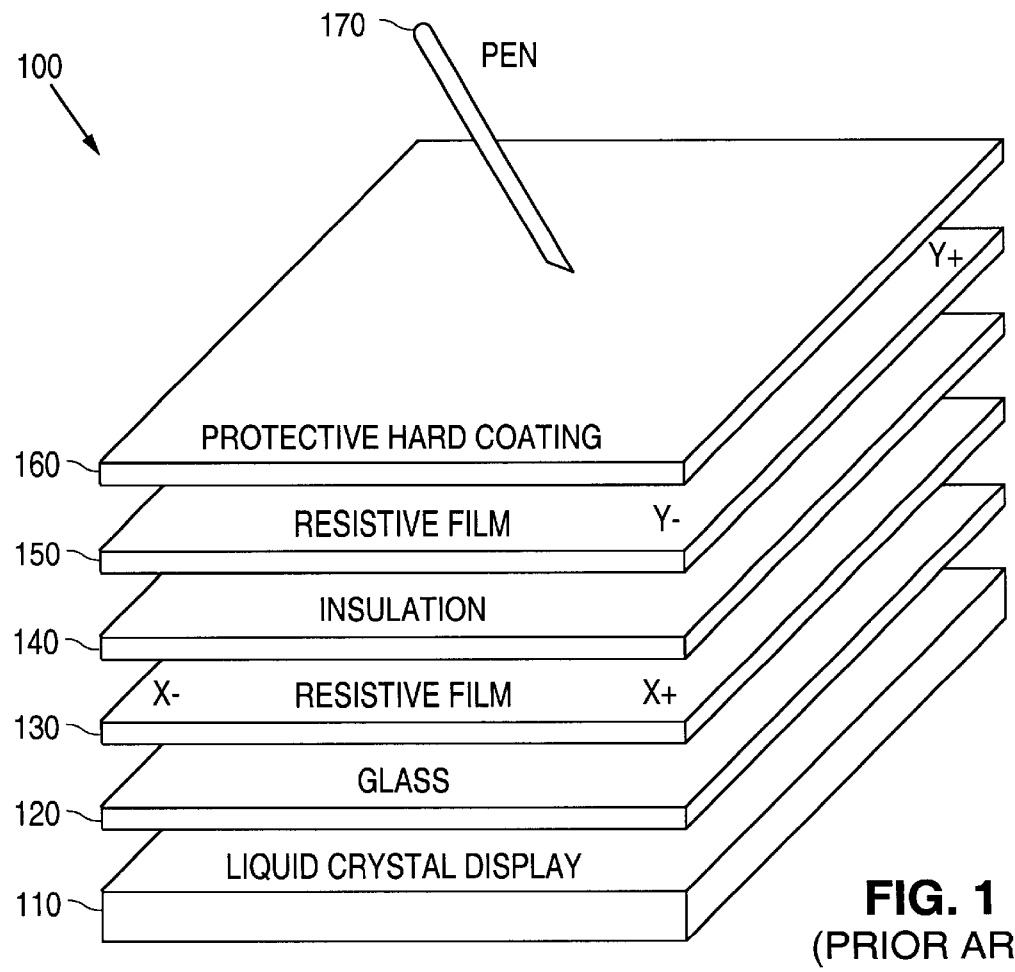
FIG. 1 illustrates an exploded perspective view of an exemplary prior art touch screen.

FIG. 1 illustrates an exploded perspective view of an exemplary prior art touch screen 100. As will be more fully described, exemplary touch screen 100 comprises a number of layers of material. The thicknesses of the layers of material shown in FIG. 1 are not drawn to scale. The thicknesses of some of the layers of material are shown enlarged for purposes of clarity.

At the base of touch screen 100 is liquid crystal display 110. Liquid crystal display 110 is shown as an example of a display device. It is understood that other types of display devices may be used in place of liquid crystal display 110.

A layer of glass 120 is placed upon top of liquid crystal display device 110. Glass 120 is shown as an example. It is understood that other types of material (e.g., transparent plastic) may be used in place of glass 120. An analog resistive film 130 is placed upon the top of glass 120. The symbols "X−" and "X+" shown on analog resistive film 130 indicate that analog resistive film 130 functions as the "X Plane" in touch screen 100. The function of the "X Plane" will be described more fully below.

Next a layer of insulation 140 is placed on top of analog resistive film 130. Then an analog resistive film 150 is placed upon the layer of insulation 140. Insulation 140 insulates analog resistive film 130 from analog resistive film 150. The symbols "Y−" and "Y+" shown on analog resistive film 150 indicate that analog resistive film 150 functions as the "Y Plane" in touch screen 100. The function of the "Y Plane" will be described more fully below. Lastly, a layer of a protective hard coating 160 is placed on top of analog resistive film 150. Protective hard coating 160 protects analog resistive film 150 from abrasions and scratches and other similar damage.

Pen 170 (sometimes referred to as a "stylus") is used to indicate points within the area of touch screen 100 by physically touching those points. The end of pen 170 touches touch screen 100 on the outer surface of protective hard coating 160. Exerting downward pressure on pen 170 causes pen 170 to push down a portion of protective hard coating 160 and underlying analog resistive film 150 to touch a portion of underlying analog resistive film 130.

Figure 2:
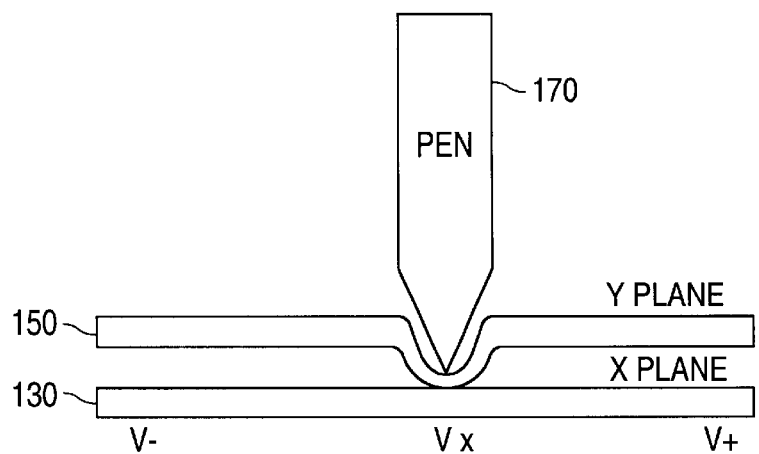
FIG. 2 illustrates a cross sectional side view showing how a pen causes a portion of a first resistive film to touch a portion of an underlying second resistive film in a prior art touch screen.

This process is shown schematically in FIG. 2. The layer of protective hard coating 160 and the layer of insulation 140 are not shown in FIG. 2. The thicknesses of protective hard coating 160 and the layer of insulation 140 are relatively thin compared to the thicknesses of analog resistive film 130 and analog resistive film 150. Therefore, protective hard coating 160 and insulation 140 do not interfere with the downward movement of pen 170 under pressure.

Figure 3:
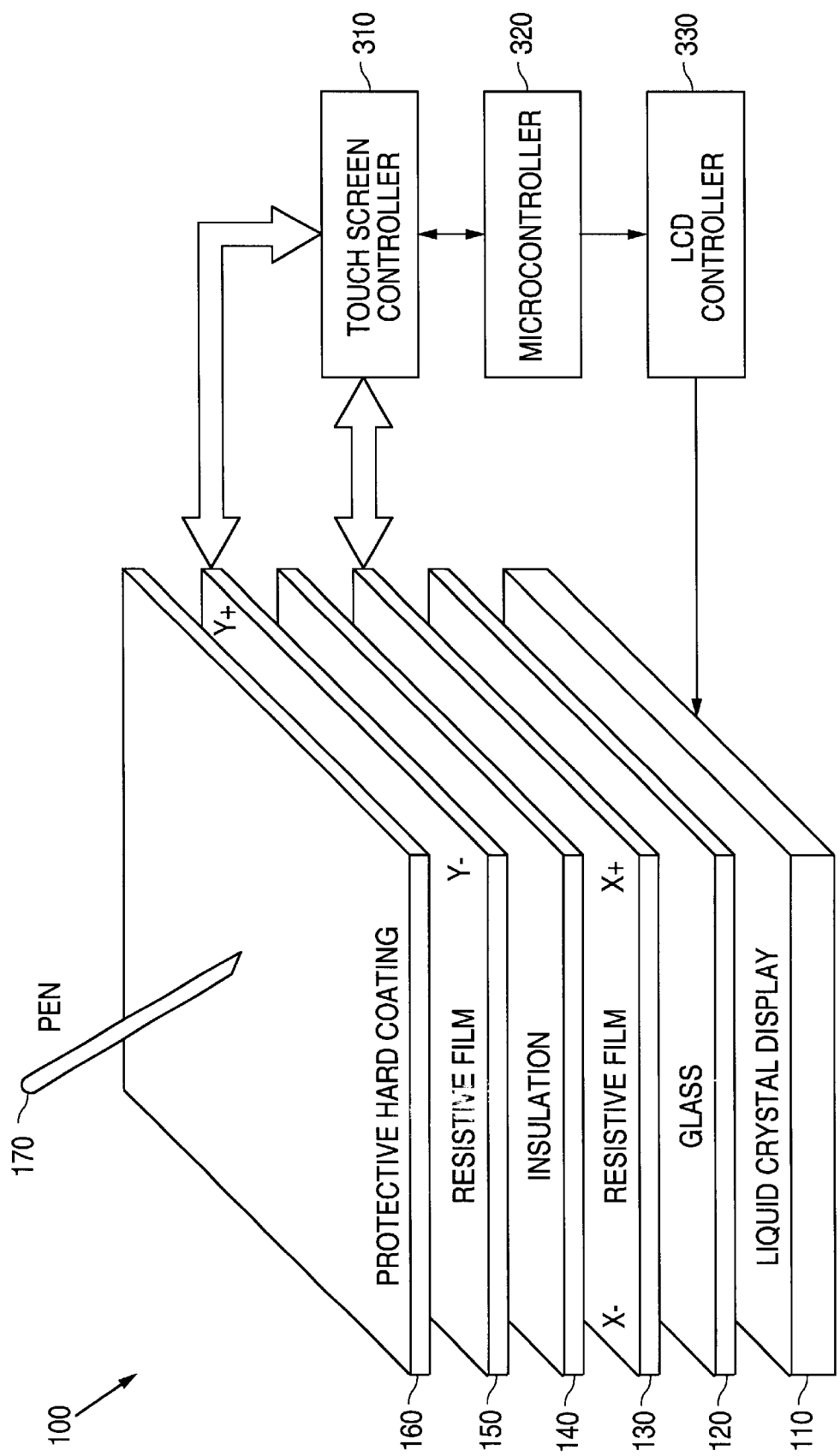
FIG. 3 illustrates an exemplary prior art touch screen system showing the components of the touch screen system coupled to a prior art touch screen shown in an exploded perspective view.

FIG. 3 illustrates an exemplary prior art touch screen system for controlling the operation of a touch screen. FIG. 3 shows the components of the touch screen system coupled to prior art touch screen 100. As in FIG. 1, touch screen 100 is shown in an exploded perspective view.

When pen 170 is in contact with touch screen 100, pen 170 causes resistive film 150 (Y Plane) to touch resistive film 130 (X Plane) at the Vx position shown in FIG. 2. To obtain the location of the X coordinate, touch screen controller 310 applies current drive to resistive film 130 (from the X− location to the X+ location). The current drive to the X Plane sets up a voltage gradient (from V− to V+) across resistive film 130. Where pen 170 touches the voltage gradient, the value of voltage is Vx. At the point of direct contact resistive film 150 (Y Plane) picks up the voltage Vx from resistive film 130 (X Plane). This voltage Vx is sensed by touch screen controller 310 and used to calculate the X coordinate of the location of pen 170. Similarly, touch screen controller 310 obtains the Y coordinate of the location of pen 170 by applying current drive to resistive film 150 (Y Plane) and sensing the voltage that is picked up by resistive film 130 (X Plane).

In this manner touch screen controller 310 receives X signals from resistive film 130 and Y signals from resistive film 150 and determines the location of pen 170 as pen 170 touches touch screen 100. Touch screen controller 310 sends information concerning the location of pen 170 to microcontroller 320. Microcontroller 320 sends information concerning the location of pen 170 to liquid crystal display controller 330. Examples of prior art touch screen controllers include Models TR88L803 and TR88L804 manufactured by TriTech Microelectronics, Inc. and Model ADS7843 manufactured by Burr-Brown Corporation.

Figure 4:
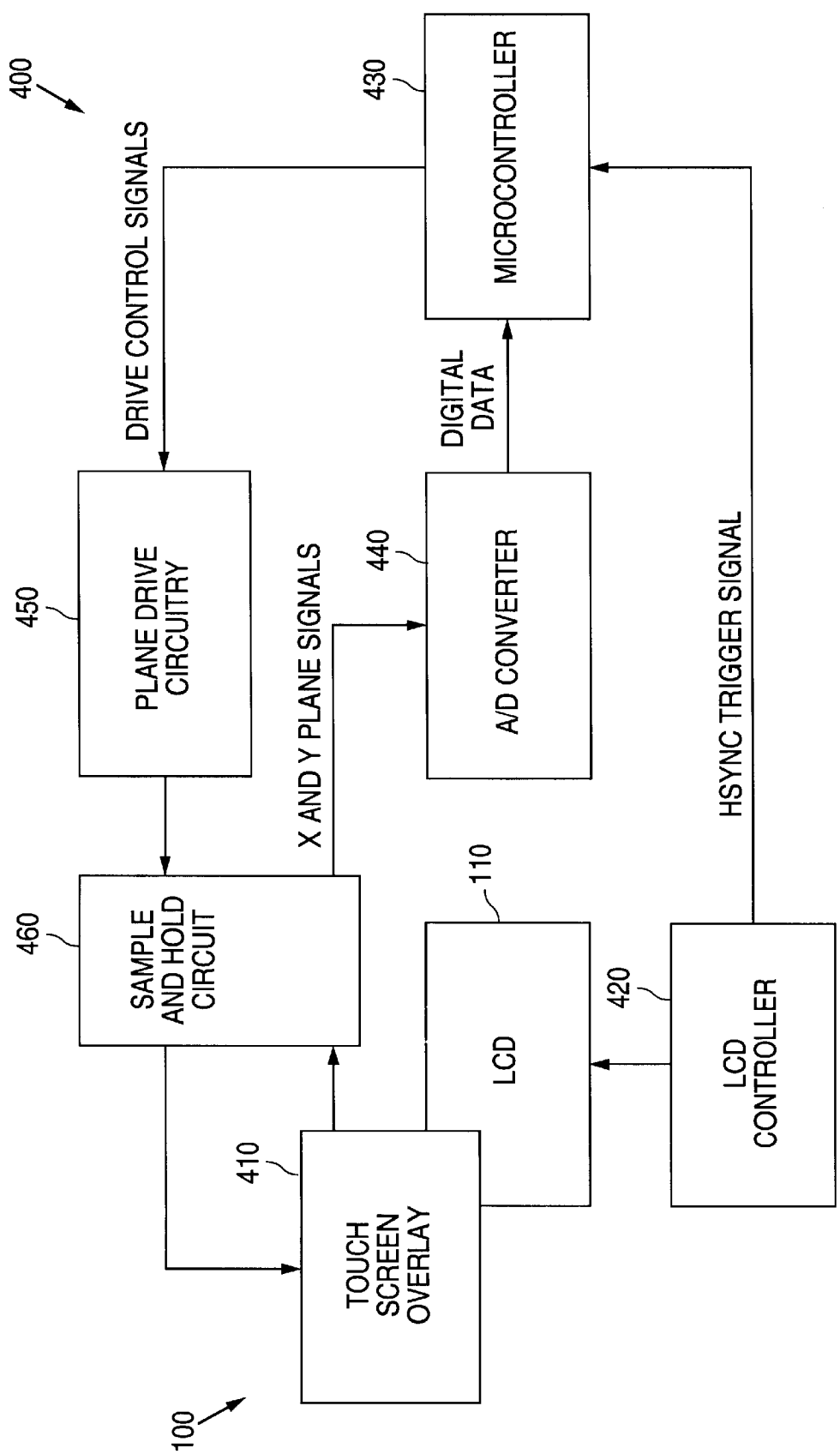
FIG. 4 illustrates a touch screen system according to one embodiment of the present invention.

Periodic noise (also referred to as "impulse" noise) that is present within a touch screen system can be greatly reduced by using synchronization techniques. FIG. 4 illustrates a touch screen system 400 that is capable of eliminating impulse noise (and other low frequency noise) in touch screen 100. In FIG. 4 touch screen 100 is shown comprising liquid crystal display 110 and touch screen overlay 410. Touch screen overlay 410 comprises all of the layers of touch screen 100 except the layer representing liquid crystal display 110.

Liquid crystal display controller 420 is coupled to liquid crystal display 110. Liquid crystal display controller 420 is also coupled to microcontroller 430. Analog to digital converter 440 is coupled to touch screen overlay 410 (through sample and hold circuit 460) to receive analog X Plane signals from resistive film 130 and analog Y Plane signals from resistive film 150. Analog to digital converter 440 converts the X Plane signals and the Y Plane signals into digital form and sends the digital data to microcontroller 430.

Microcontroller 430 is coupled to plane drive circuitry 450. Microcontroller 430 sends drive control signals to plane drive circuitry 450. In response, plane drive circuitry 450 sends X Plane control signals to resistive film 130 and Y Plane control signals to resistive film 150 within touch screen overlay 410. The X Plane control signals and the Y Plane control signals from plane drive circuitry 450 first go to sample and hold circuit 460 and then to touch screen overlay 410.

To eliminate impulse noise and other low frequency noise in touch screen 100, liquid crystal display controller 420 sends a synchronization trigger signal to microcontroller 430. The synchronization trigger signal is referred to as the HSYNC TRIGGER SIGNAL or simply the HSYNC signal. Receipt of the HSYNC signal causes microcontroller 430 to start and complete the process of receiving and converting analog signals from touch screen overlay 410 at a specific, repeatable point within the noise envelope. This effectively causes the impulse noise to be converted into direct current (DC) offset noise signal. The DC offset noise signal is then removed using an adaptive "offset and scaling" equation.

Figure 5:
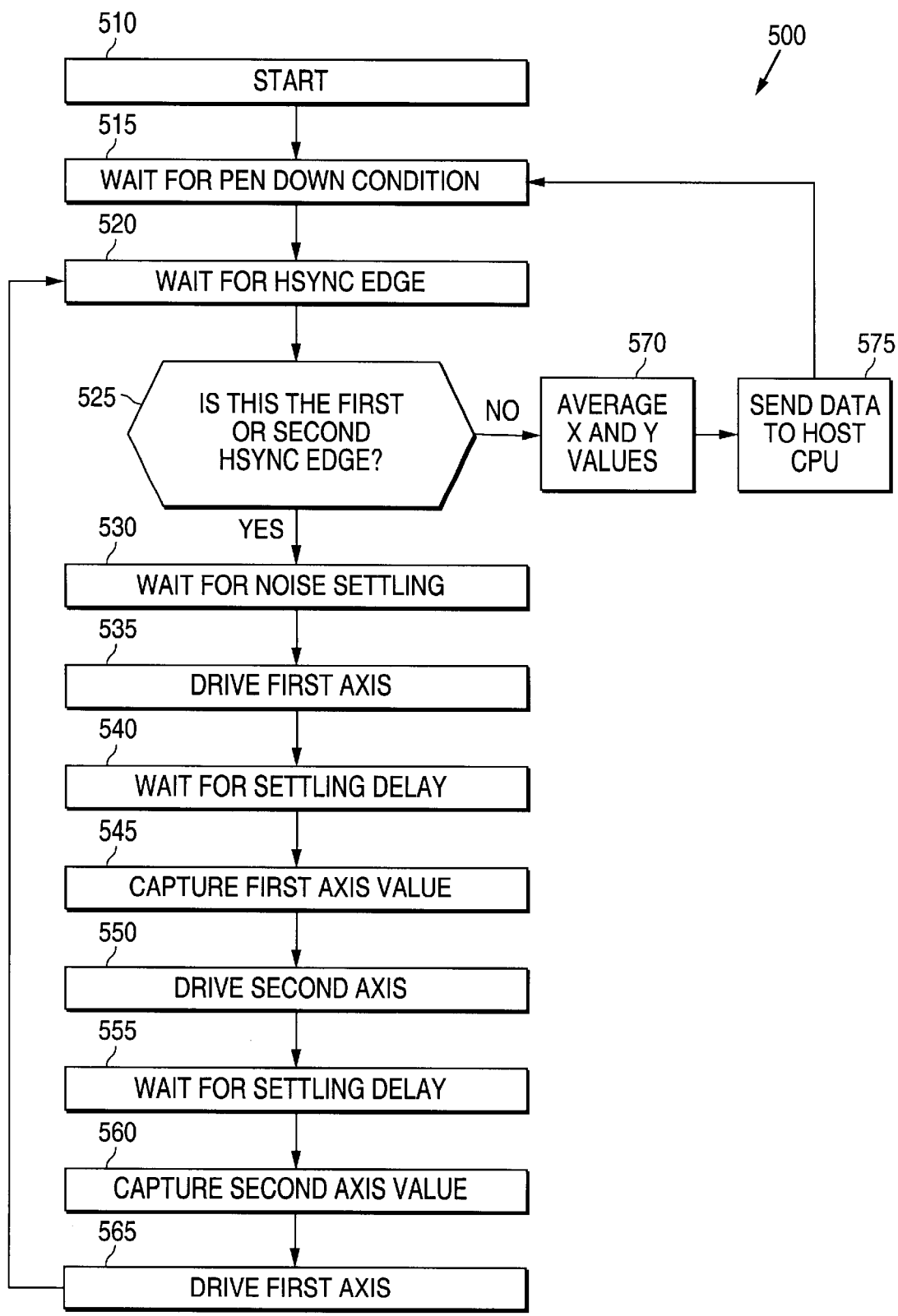
FIG. 5 is a flow diagram illustrating an operation of the touch screen system according to one embodiment of the present invention.

FIG. 5 is a flow diagram illustrating the operation of touch screen system 400 according to the embodiment of the present invention illustrated in FIG. 4. The steps in the operation are collectively identified with reference numeral 500. At the beginning of the operation (step 510) microcontroller 430 enters a wait state and waits to receive a signal that indicates that pen 170 is touching touch screen 100 (i.e., pen 170 is in a "down" condition) (step 515). After microcontroller 430 receives a signal that indicates that pen 170 is in a "down" condition, microcontroller 430 waits to receive the leading edge of the HSYNC signal from liquid crystal display controller 420 (step 520).

After microcontroller 430 determines that it has received the leading edge of the first HSYNC signal from liquid crystal display controller 420 (step 525), then microcontroller 430 waits for a predetermined period of time to allow the noise signal to settle (step 530). For example, in one advantageous embodiment of the present invention it was noted that an impulse noise spike almost always occurred approximately five microseconds (5 $\mu$sec) after the leading edge of the HSYNC signal. In this embodiment, microcontroller 430 was programmed to wait approximately one hundred forty microseconds (140 $\mu$sec) after the leading edge of the HSYNC signal for the impulse noise spike to settle. It is noted that these time periods are illustrative. That is, the time periods actually observed for a particular embodiment of the present invention will depend upon the particular hardware configuration that is used.

Microcontroller 430 then sends a control signal to plane drive circuitry 450 and to touch screen overlay 410 to drive the first axis (step 535). After waiting for the settling delay (step 540), the value of voltage on the first axis is "captured" (step 545). The word "captured" means that the value is read and stored for future retrieval and use.

Microcontroller 430 then sends a control signal to plane drive circuitry 450 and to touch screen overlay 410 to drive the second axis (step 550). After waiting for the settling delay (step 555), the value of voltage on the second axis is also "captured" (step 560). Microcontroller 430 then sends a control signal to plane drive circuitry 450 and to touch screen overlay 410 to drive the first axis again (step 565).

Microcontroller 430 then waits for the leading edge of the next HSYNC signal (step 520). In this particular embodiment of the present invention, the period of the HSYNC signal is approximately twenty six microseconds (26 $\mu$sec). After microcontroller 430 determines that it has received the leading edge of the second HSYNC signal from liquid crystal display controller 420 (step 525), then microcontroller 430 again executes the above described series of steps (steps 530 through 565) to acquire a second value for the voltage on the first axis and a second value for the voltage on the second axis.

Microcontroller 430 then again waits for the leading edge of the next HSYNC signal (step 520). On receipt of the leading edge of the third HSYNC signal, microcontroller 430 causes the two "captured" X values to be averaged and causes the two "captured" Y values to be averaged (step 570). Averaging the values of two samples on successive HSYNC periods removes a particular noise component in the noise signal that is a constant waveshape, constant amplitude, alternating polarity noise. For convenience, this noise component will be referred to as a "compressed squarewave" noise component. The averaging process removes the "compressed squarewave" noise component because the "compressed squarewave" noise component alternates polarity with each HSYNC signal. In a manner similar to that of the impulse noise spike, the "compressed squarewave" noise component occurs within a set time period (e.g., five microseconds (5 μsec)) after the leading edge of each HSYNC signal.

Microcontroller 430 then sends the average value of the X Plane signals and the average value of the Y Plane signals to a host central processing unit (not shown) (step 575). Microcontroller 430 then enters a wait state to wait for pen 170 to again return to a "down" condition (step 515).

The average values of the X Plane signals and the Y Plane signals obtained in this manner exhibit significant noise reduction. For example, in one particular embodiment of the present invention, the noise reduction method of the present invention reduced the noise signal from a level of "plus or minus ten (10) pixels" to a level of "plus or minus one (1) pixel." This represents a ninety percent (90%) reduction in the noise signal. This amount of reduction in the noise signal is illustrative of the levels of noise reduction that may be achieved. A level of ninety percent (90%) noise reduction is not a limit on the noise reduction that may be achieved by the present invention. Even greater levels of noise reduction may be achieved depending upon the particular arrangement of hardware and software employed to practice the method of the present invention.

Two X values are averaged to obtain an average value for the X plane signal. Similarly, two Y values are averaged to obtain an average value for the Y plane signal. The noise reduction method of the present invention uses average values because some types of liquid crystal display controllers 420 alternately switch the polarity of the signal used to drive the liquid crystal display 110.

This is because a liquid crystal display can only function by utilizing an alternating current waveform to activate a pixel. Any direct current component will lead to eventual damage of the liquid crystal display. To avoid this result, some types of liquid crystal display controllers 420 switch the polarity of the drive signal during the first horizontal synchronization trigger signal (HSYNC) and a vertical synchronization trigger signal (VSYNC). This means that each time the screen is redrawn, a particular position will have a polarity that is opposite to the polarity that it had the last time the screen was drawn. Alternating the polarity of the drive signal guarantees that each line will have only an alternating current component. Alternating the polarity of the drive signal also guarantees that all alternating lines will have alternating polarity.

Using average values of X plane signals and average values of Y plane signals takes into account the fact that the "compressed squarewave" noise component alternates polarity with each HSYNC signal.

Figure 6:
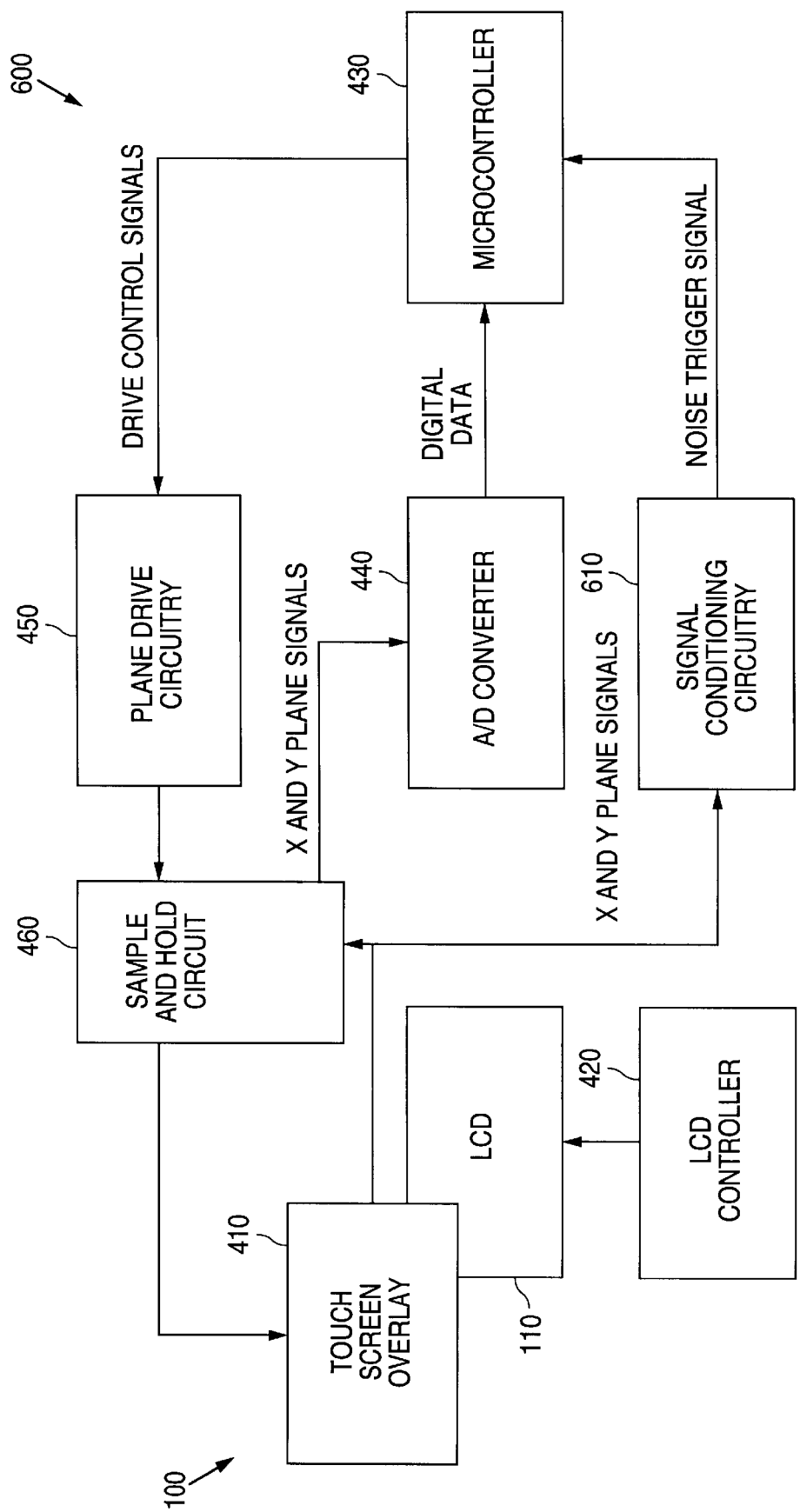
FIG. 6 illustrates a touch screen system according to another embodiment of the present invention.

FIG. 6 illustrates touch screen system 600 according to another embodiment of the present invention. Touch screen system 600 is similar to touch screen system 400. In touch screen system 600, however, liquid crystal display controller 420 is not coupled to microcontroller 430 and does not send a HSYNC signal to microcontroller 430. As before, the X Plane signals and the Y Plane signals from touch screen overlay 410 are coupled to analog to digital converter 440 through sample and hold circuit 460. In FIG. 6, however, the X Plane signals and the Y Plane signals are also coupled to signal conditioning circuitry 610.

Signal conditioning circuitry 610 monitors the values of the X Plane signals and the Y Plane signals. Signal conditioning circuitry 610 analyzes the X Plane signals and the Y Plane signals to determine when to send a noise trigger signal to microcontroller 430. The noise trigger signal sent by signal conditioning circuitry 610 is similar in form and function to the HSYNC signal.

When microcontroller 430 receives the noise trigger signal, then microcontroller 430 starts and completes the process of receiving and converting analog signals from touch screen overlay 410 at a specific, repeatable point within the noise envelope. The method of noise reduction is the same as that described for touch screen system 400.

Figure 7:
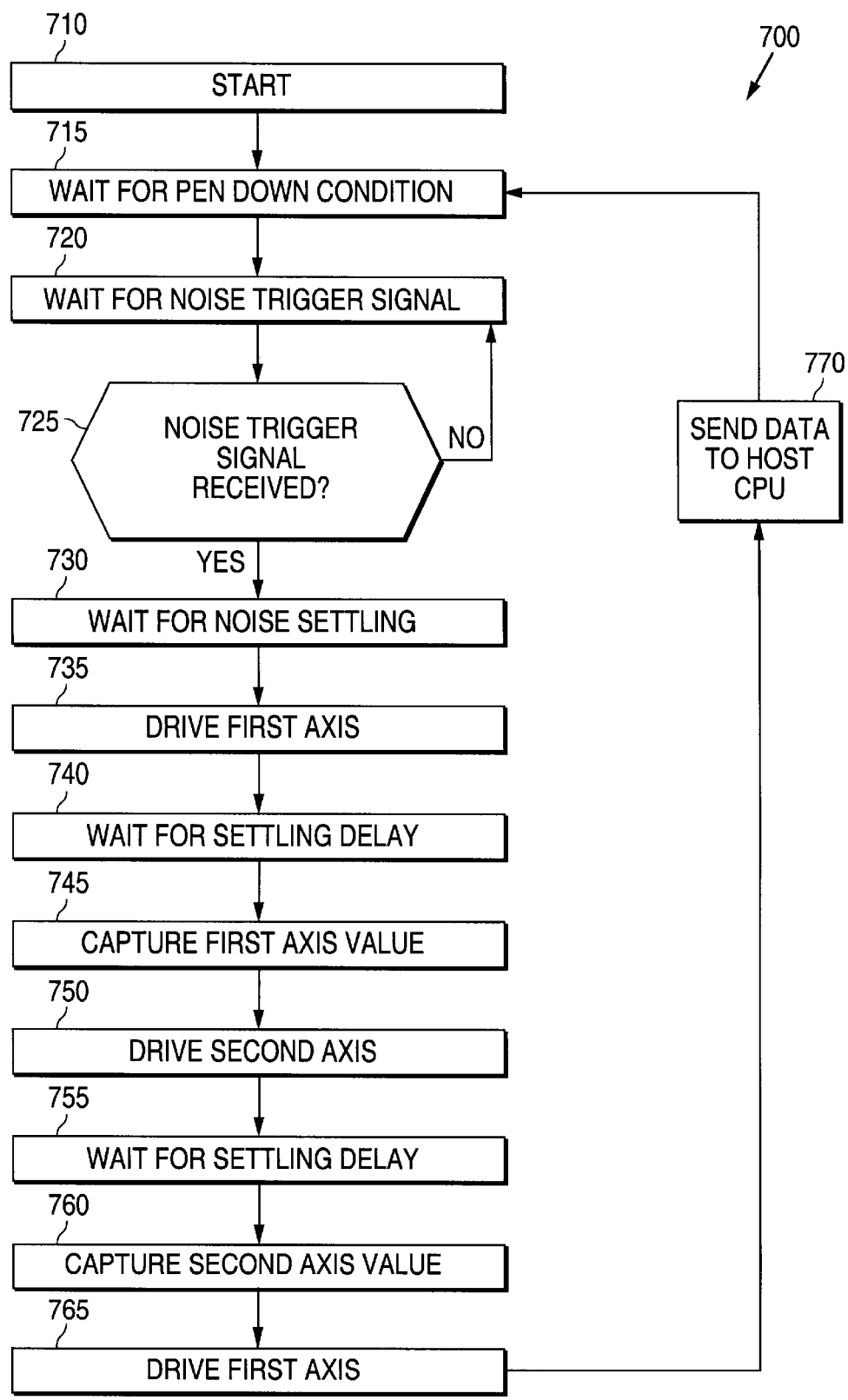
FIG. 7 is a flow diagram illustrating another operation of the touch screen system according to another embodiment of the present invention.

FIG. 7 is a flow diagram illustrating the operation of touch screen system 600 for reducing noise according to the embodiment of the present invention illustrated in FIG. 6. The steps in the operation are collectively identified with reference numeral 700. At the beginning of the operation (step 710) microcontroller 430 enters a wait state and waits to receive a signal that indicates that pen 170 is touching touch screen 100 (i.e., pen 170 is in a "down" condition) (step 715). After microcontroller 430 receives a signal that indicates that pen 170 is in a "down" condition, microcontroller 430 waits to receive the noise trigger signal from signal conditioning circuitry 610 (step 720).

Microcontroller 430 determines whether it has received the noise trigger signal from signal conditioning circuitry 610 (decision step 725). If the noise trigger signal has not been received, microcontroller 430 continues to wait (step 720). If the noise trigger signal has been received, microcontroller 430 waits for a predetermined period of time to allow the noise signal to settle (step 730).

Microcontroller 430 then sends a control signal to plane drive circuitry 450 and to touch screen overlay 410 (via sample and hold circuit 460) to drive the first axis (step 735). After waiting for the settling delay (step 740), the value of voltage on the first axis is "captured" (step 745). As before, the word "captured" means that the value is read and stored for future retrieval and use.

Microcontroller 430 then sends a control signal to plane drive circuitry 450 and to touch screen overlay 410 (via sample and hold circuit 460) to drive the second axis (step 750). After waiting for the settling delay (step 755), the value of voltage on the second axis is also "captured" (step 760). Microcontroller 430 then sends a control signal to plane drive circuitry 450 and to touch screen overlay 410 (via sample and hold circuit 460) to drive the first axis again (step 765).

Microcontroller 430 then sends the value of the X Plane signal and the value of the Y Plane signal to a host central processing unit (not shown) (step 770). The value of the X Plane signal and the value of the Y Plane signal obtained in this manner exhibit significant noise reduction. Microcontroller 430 then enters a wait state to wait for pen 170 to again return to a "down" condition (step 715).

In this embodiment of the method of the present invention, when microcontroller 430 receives the noise trigger signal, then microcontroller 430 starts and completes the process of receiving and converting analog signals from touch screen overlay 410 at a specific, repeatable point within the noise envelope.

Figure 8:
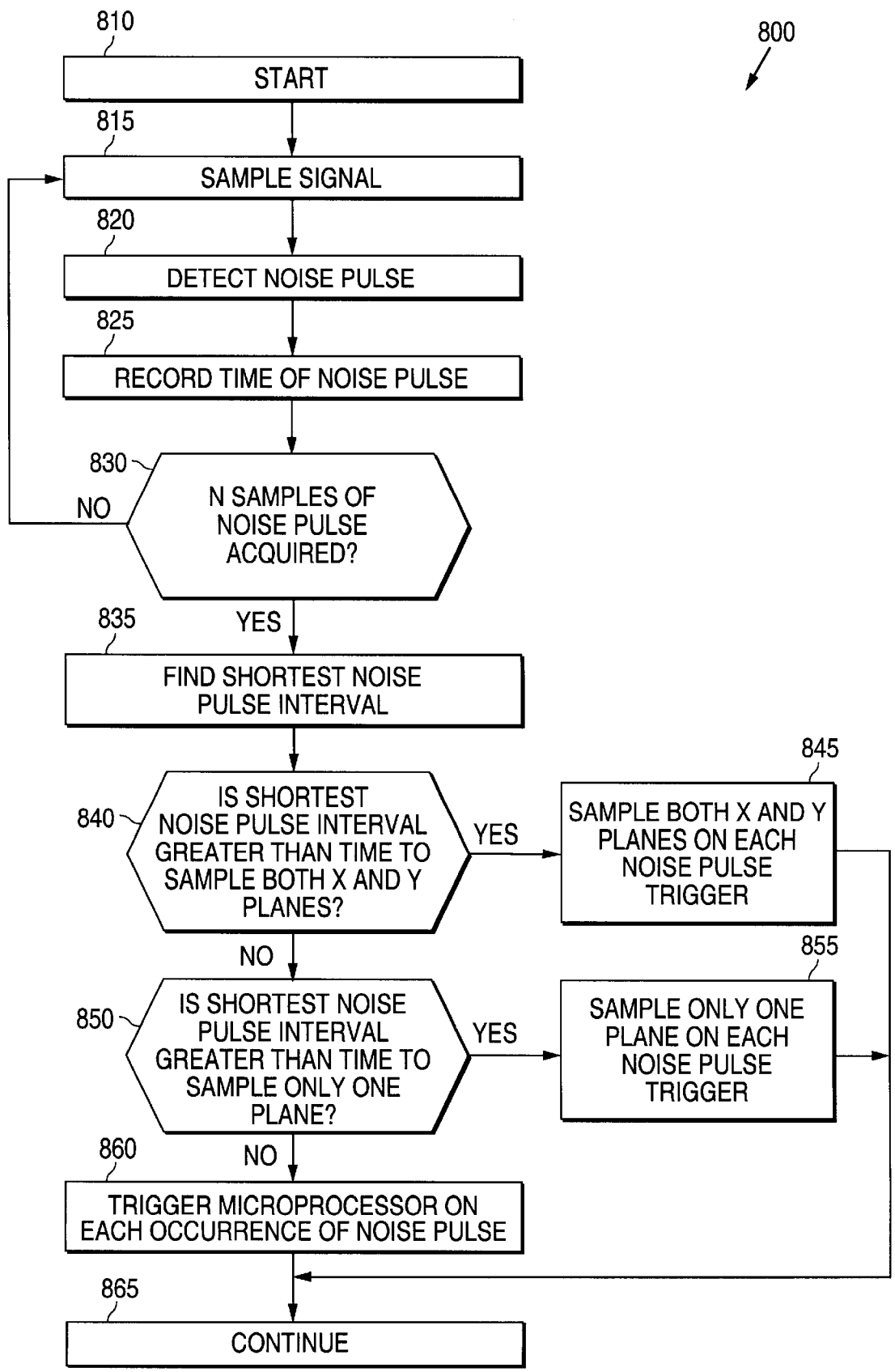
FIG. 8 is a flow diagram illustrating another operation of the touch screen system according to another embodiment of the present invention.

FIG. 8 is a flow diagram illustrating another operation of touch screen system 600 for reducing impulse type noise. The steps in the operation are collectively identified with reference numeral 800. At the beginning of the operation (step 810) microcontroller 430 starts to sample signals (with noise) from analog to digital converter 440 (step 815). Microcontroller 430 detects a noise pulse in the signal (step 820) and records the time of the noise pulse (step 825).

Microcontroller 430 then determines whether it has acquired N samples of noise pulse (decision step 830). The value N is a preselected value of noise pulse samples to be taken. If N samples of noise pulse have not been acquired, then the steps of the sampling process (step 815), the detection process (step 820), and the recording process (step 825) are repeated until N samples of noise pulse have been acquired.

When N samples of noise pulse have been acquired, then the times of the noise pulses are compared to find the shortest noise pulse interval (step 835). Then the shortest noise pulse interval is compared to the time that is required to sample both the X plane signal and the Y plane signal (decision step 840). If the shortest noise pulse interval is greater than the time required to sample both the X plane signal and the Y plane signal, then both the X plane signal and the Y plane signal are sampled on each noise pulse trigger (step 845). The process then continues in the normal mode of operation (step 865).

If the shortest noise pulse interval is not greater than the time required to sample both the X plane signal and the Y plane signal, then a comparison is made to determine whether the shortest noise pulse interval is greater than the time required to sample one of the plane signals (either the X signal or the Y signal). If the shortest noise pulse interval is greater than the time required to sample one of the plane signals, then one of the plane signals (either the X signal or the Y signal) is sampled on each noise pulse trigger (step 855). The process then continues in the normal mode of operation (step 865).

If the shortest noise pulse interval is not greater than the time required to sample one plane signal, then microcontroller 430 will be triggered on each occurrence of a noise pulse (step 860). The process then continues in the normal mode of operation (step 865).

In this embodiment of the method of the present invention, when microcontroller 430 receives the noise trigger signal, then microcontroller 430 starts and completes the process of receiving and converting analog signals from touch screen overlay 410 at a specific, repeatable point within the noise envelope.

Figure 9:
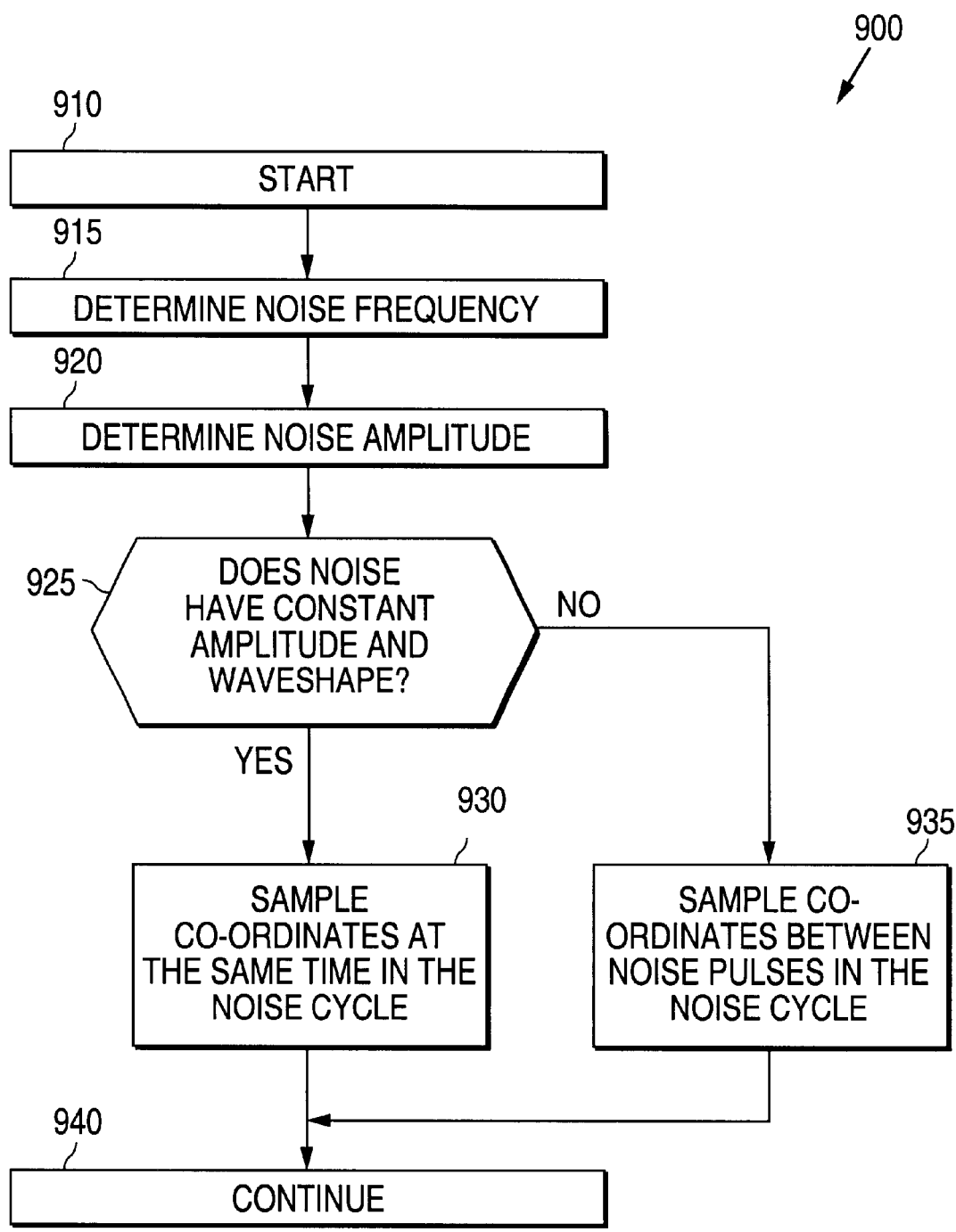
FIG. 9 is a flow diagram illustrating another operation of the touch screen system according to another embodiment of the present invention.

FIG. 9 is a flow diagram illustrating another operation of touch screen system 600 for reducing noise of the type having low frequency, constant waveshape, and constant amplitude. The steps in the operation are collectively identified with reference numeral 900. The method described in FIG. 9 is employed after microcontroller 430 has obtained N samples of the noise signal as previously described in the method shown in FIG. 8. At the beginning of the method (step 910) microcontroller 430 determines the frequency of the noise signal from the N samples of noise signal (step 915). Microcontroller 430 then determines the amplitude of the noise signal from the N samples of noise signal (step 920).

Microcontroller 430 then determines whether the noise signal has a constant amplitude and waveshape (decision step 925). If the noise signal has a constant amplitude and waveshape, then microcontroller 430 samples the X Plane value and the Y Plane value at the same time in the noise cycle (step 930). The process then continues in the normal mode of operation (step 940). If the noise signal does not have a constant amplitude and waveshape, then microcontroller 430 treats the noise signal as impulse noise and samples the X Plane value and the Y Plane value between noise pulses in the noise cycle (step 935). The process then continues in the normal mode of operation (step 940).

Noise induced into touch screen 100 by external devices such as backlight inverters (not shown) of liquid crystal display 110 appears as common mode noise on all the terminals of touch screen 100. A method of eliminating this common mode noise in touch screen 100 comprises the step of actively sensing the ground return offset of touch screen 100. The ground return offset is a measure of the common mode noise. The ground return offset may be used as a direct current (DC) offset noise signal. The DC offset noise signal may be removed using an adaptive "offset and scaling" equation.

Another method for eliminating common mode noise in touch screen 100 comprises the step of simultaneously sending the data from all channels to sample and hold circuit 460. Sending the data through sample and hold circuit 460 will eliminate the common mode noise component in the data signals.

In many types of electronic systems, common mode noise can be eliminated by simultaneously sampling all the inputs and subtracting out the constant offset. For a resistive touch system, however, there are several factors that make the process more difficult.

One factor is that the conductive layer closest to the noise has a larger amplitude of noise than the conductive layer farther from the noise. This means that one co-ordinate will be affected more than the other co-ordinate. The conductive layer farther from the noise has a lower noise amplitude because 1) noise amplitude is reduced in proportion to the square of the distance from the noise source, and 2) the conductive layer closest to the noise provides some electromagnetic shielding effects.

A second factor is that the transistors that are used to drive the plane plus (+) signals and the plane minus (−) signals are usually not impedance matched. This means that the noise is greater on the highest impedance signal, which is usually the plane plus (+) signal.

The system and method of the present invention is capable of reducing noise in touch screen systems by mathematically removing noise components with a microcontroller. In addition, the system and method of the present invention is able to compensate for the effect of differing levels of noise on each different level of a touch screen system. The system and method of the present invention comprises a microcontroller that executes instructions from software algorithms to dynamically adjust to the occurrence of differing types of noise.

The system and method of the present invention is simpler and less costly than equivalent hardware systems for accomplishing the same functions. In addition, the sample and hold circuitry of the present invention significantly reduces the speed requirements of the analog to digital converter circuitry. In general, the system and method of the present invention provides a cost efficient, simple system for reducing noise in touch screen systems.

Although the present invention has been described in detail, those skilled in the art should understand that they can make various changes, substitutions and alterations herein without departing from the spirit and scope of the invention in its broadest form.

What is claimed is:

1. For use in a touch screen system of the type comprising an analog to digital converter capable of converting to digital signals analog signals from at least one analog resistive film in a touch screen indicative of a location within said touch screen, an apparatus for reducing noise in said touch screen comprising:

a microcontroller coupled to said analog to digital converter, said microcontroller capable of receiving a synchronization trigger signal, and in response to receiving said synchronization trigger signal, capable of waiting to receive said digital signals from said analog to digital converter until the expiration of a period of time in which noise associated with said synchronization trigger signal has occurred.

2. The apparatus as claimed in claim 1 wherein said microcontroller receives said synchronization trigger signal from a liquid display controller.

3. The apparatus as claimed in claim 1 wherein said microcontroller receives said synchronization trigger signal from signal conditioning circuitry.

4. The apparatus as claimed in claim 1 wherein said noise comprises an impulse noise spike that occurs within a predetermined time period after the leading edge of said synchronization trigger signal.

5. The apparatus as claimed in claim 1 wherein said noise comprises a compressed squarewave noise component that occurs within a predetermined time period after the leading edge of said synchronization trigger signal.

6. The apparatus as claimed in claim 1 wherein said microcontroller is capable of:

waiting to receive said digital signals from said analog to digital converter until the expiration of a first period of time in which noise associated with a first synchronization trigger signal has occurred;

recording a first value that represents a location in said touch screen;

waiting to receive said digital signals from said analog to digital converter until the expiration of a second period of time in which noise associated with a second synchronization trigger signal has occurred;

recording a second value that represents said location in said touch screen; and averaging said first and second values to obtain a value of said location with reduced noise.

7. The apparatus as claimed in claim 6 wherein said noise is reduced from a noise level of plus or minus ten pixels to a noise level no greater than plus or minus one pixel.

8. The apparatus as claimed in claim 1 wherein said microcontroller waits a predetermined time period after receiving the leading edge of said synchronization trigger signal to receive said digital signals from said analog to digital converter.

9. The apparatus as claimed in claim 1 wherein said microcontroller is capable of:

sampling signals from said analog to digital converter;

detecting noise pulses in said sampled signals;

recording the time of arrival of each noise pulse;

detecting a preselected number, N, of noise pulses;

determining the shortest noise pulse interval;

determining whether said shortest noise pulse interval is greater than the time to sample both an X plane signal and a Y plane signal;

sampling both said X plane signal and said Y plane signal on each noise pulse trigger if said shortest noise pulse interval is greater than the time to sample both an X plane signal and a Y plane signal;

determining whether said shortest noise pulse interval is greater than the time to sample only one of the plane signals if said shortest noise pulse interval is not greater than the time to sample both an X plane signal and a Y plane signal;

sampling only one of the plane signals on each noise pulse trigger if said shortest noise pulse interval is greater than the time to sample only one of the plane signals; and triggering said microcontroller on each occurrence of a noise pulse if said shortest noise pulse interval is not greater than the time to sample only one of the plane signals.

10. The apparatus as claimed in claim 1 wherein said microcontroller is capable of:

sampling signals from said analog to digital converter;

detecting a noise signal in said sampled signals;

recording the time of arrival of each sample of noise signal;

detecting a preselected number, N, of samples of noise signal;

determining the frequency of said noise signal from said N samples of noise signal;

determining the amplitude of said noise signal from said N samples of noise signal;

determining whether said noise signal has a constant amplitude and waveshape;

sampling an X plane value and a Y plane value at the same time in a noise cycle if said noise signal has a constant amplitude and waveshape; and sampling an X plane value and a Y plane value between noise pulses in said noise cycle if said noise signal does not have a constant amplitude and waveshape.

11. The apparatus as claimed in claim 1 wherein said microcontroller is capable of:

simultaneously sending data signals from all channels of said touch screen to a sample/hold circuit; and removing said common mode noise from said data signals by holding said data signals in said sample/hold circuit.

12. For use in a touch screen system of the type comprising an analog to digital converter capable of converting to digital signals analog signals from at least one analog resistive film in a touch screen indicative of a location within said touch screen, an apparatus for reducing noise in said touch screen comprising:

a microcontroller coupled to said analog to digital converter, said microcontroller capable of receiving a noise trigger signal, and in response to receiving said noise trigger signal, capable of waiting to receive said digital signals from said analog to digital converter until the expiration of a period of time in which noise associated with said noise trigger signal has occurred.

13. The apparatus as claimed in claim 12 wherein said microcontroller receives said noise trigger signal from signal conditioning circuitry.

14. The apparatus as claimed in claim 12 wherein said microcontroller is capable of:

waiting to receive said noise trigger signal;

waiting for a noise signal to settle after said noise trigger signal has been received;

sending a control signal to drive a first axis to obtain a first axis measurement;

waiting for settling delay on a first axis signal;

recording a first value of said first axis measurement that represents a location in said touch screen;

sending a control signal to drive a second axis to obtain a second axis measurement;

waiting for settling delay on a second axis signal;

recording a second value of said second axis measurement that represents said location in said touch screen; and using said first value of said first axis measurement and said second value of said second axis measurement to obtain a value of said location with reduced noise.

15. A touch screen system comprising:

a display device;

at least one analog resistive film within a touch screen placed over said display device, said at least one analog resistive film capable of creating analog signals indicative of a location within said touch screen;

an analog to digital converter capable of converting to digital signals said analog signals from said at least one analog resistive film, said touch screen system comprising an apparatus for reducing noise in said touch screen comprising:

a microcontroller coupled to said analog to digital converter, said microcontroller capable of receiving a synchronization trigger signal, and in response to receiving said synchronization trigger signal, capable of waiting to receive said digital signals from said analog to digital converter until the expiration of a period of time in which noise associated with said synchronization trigger signal has occurred.

16. The touch screen system as claimed in claim 15 wherein said microcontroller is capable of:

waiting to receive said digital signals from said analog to digital converter until the expiration of a first period of time in which noise associated with a first synchronization trigger signal has occurred;

recording a first value that represents a location in said touch screen;

waiting to receive said digital signals from said analog to digital converter until the expiration of a second period of time in which noise associated with a second synchronization trigger signal has occurred;

recording a second value that represents said location in said touch screen; and averaging said first and second values to obtain a value of said location with reduced noise.

17. The touch screen system as claimed in claim 16 wherein said noise is reduced from a noise level of plus or minus ten pixels to a noise level no greater than plus or minus one pixel.

18. The touch screen system as claimed in claim 15 wherein said microcontroller waits a predetermined time period after receiving the leading edge of said synchronization trigger signal to receive said digital signals from said analog to digital converter.

19. The touch screen system as claimed in claim 15 wherein said microcontroller is capable of:

sampling signals from said analog to digital converter;

detecting noise pulses in said sampled signals;

recording the time of arrival of each noise pulse;

detecting a preselected number, N, of noise pulses;

determining the shortest noise pulse interval;

determining whether said shortest noise pulse interval is greater than the time to sample both an X plane signal and a Y plane signal;

sampling both said X plane signal and said Y plane signal on each noise pulse trigger if said shortest noise pulse interval is greater than the time to sample both an X plane signal and a Y plane signal;

determining whether said shortest noise pulse interval is greater than the time to sample only one of the plane signals if said shortest noise pulse interval is not greater than the time to sample both an X plane signal and a Y plane signal;

sampling only one of the plane signals on each noise pulse trigger if said shortest noise pulse interval is greater than the time to sample only one of the plane signals; and triggering said microcontroller on each occurrence of a noise pulse if said shortest noise pulse interval is not greater than the time to sample only one of the plane signals.

20. The touch screen system as claimed in claim 15 wherein said microcontroller is capable of:

sampling signals from said analog to digital converter;

detecting a noise signal in said sampled signals;

recording the time of arrival of each sample of noise signal;

detecting a preselected number, N, of samples of noise signal;

determining the frequency of said noise signal from said N samples of noise signal;

determining the amplitude of said noise signal from said N samples of noise signal;

determining whether said noise signal has a constant amplitude and waveshape;

sampling an X plane value and a Y plane value at the same time in a noise cycle if said noise signal has a constant amplitude and waveshape; and sampling an X plane value and a Y plane value between noise pulses in said noise cycle if said noise signal does not have a constant amplitude and waveshape.

21. The touch screen system as claimed in claim 15 wherein said microcontroller is capable of:

simultaneously sending data signals from all channels of said touch screen to a sample and hold circuit; and removing said common mode noise from said data signals by holding said data signals in said sample and hold circuit.

22. A touch screen system comprising:

a display device;

at least one analog resistive film within a touch screen placed over said display device, said at least one analog resistive film capable of creating analog signals indicative of a location within said touch screen;

an analog to digital converter capable of converting to digital signals said analog signals from said at least one analog resistive film, said touch screen system comprising an apparatus for reducing noise in said touch screen comprising:

a microcontroller coupled to said analog to digital converter, said microcontroller capable of receiving a noise trigger signal, and in response to receiving said noise trigger signal, capable of waiting to receive said digital signals from said analog to digital converter until the expiration of a period of time in which noise associated with said noise trigger signal has occurred.

23. The touch screen system as claimed in claim 22 wherein said microcontroller is capable of:
waiting to receive said noise trigger signal;
waiting for a noise signal to settle after said noise trigger signal has been received;
sending a control signal to drive a first axis to obtain a first axis measurement;
waiting for settling delay on a first axis signal;
recording a first value of said first axis measurement that represents a location in said touch screen;
sending a control signal to drive a second axis to obtain a second axis measurement;
waiting for settling delay on a second axis signal;
recording a second value of said second axis measurement that represents said location in said touch screen; and
using said first value of said first axis measurement and said second value of said second axis measurement to obtain a value of said location with reduced noise.

24. For use in a touch screen system of the type comprising an analog to digital converter capable of converting to digital signals analog signals from at least one analog resistive film in a touch screen indicative of a location within said touch screen, a method for reducing noise in said touch screen comprising the steps of:
receiving a synchronization trigger signal in a microcontroller coupled to said digital to analog converter;
waiting until the expiration of a period of time in which noise associated with said synchronization trigger signal has occurred; and
receiving said digital signals in said microcontroller.

25. The method as claimed in claim 24 further comprising the steps of:
sending a first synchronization signal to a microcontroller coupled to said analog to digital converter;
waiting to receive said digital signals from said analog to digital converter in said microcontroller until the expiration of a first period of time in which noise associated with said first synchronization trigger signal has occurred;
recording in said microcontroller a first value that represents a location in said touch screen;
sending a second synchronization signal to said microcontroller;
waiting to receive said digital signals from said analog to digital converter in said microcontroller until the expiration of a second period of time in which noise associated with said second synchronization trigger signal has occurred;
recording in said microcontroller a second value that represents said location in said touch screen; and
averaging said first and second values to obtain a value of said location with reduced noise.

26. The method as claimed in claim 24 further comprising the steps of:
waiting to receive a noise trigger signal in said microcontroller;
waiting for a noise signal to settle after said noise trigger signal has been received;
sending a control signal from said microcontroller to drive a first axis to obtain a first axis measurement;
waiting for settling delay on a first axis signal;
recording a first value of said first axis measurement that represents a location in said touch screen;
sending a control signal from said microcontroller to drive a second axis to obtain a second axis measurement;
waiting for settling delay on a second axis signal;
recording a second value of said second axis measurement that represents said location in said touch screen; and
using said first value of said first axis measurement and said second value of said second axis measurement to obtain a value of said location with reduced noise.

27. The method as claimed in claim 24 further comprising the steps of:
sampling signals from said analog to digital converter in said microcontroller;
detecting noise pulses in said sampled signals;
recording the time of arrival of each noise pulse;
detecting a preselected number, N, of noise pulses;
determining the shortest noise pulse interval;
determining whether said shortest noise pulse interval is greater than the time to sample both an X plane signal and a Y plane signal;
sampling both said X plane signal and said Y plane signal on each noise pulse trigger if said shortest noise pulse interval is greater than the time to sample both an X plane signal and a Y plane signal;
determining whether said shortest noise pulse interval is greater than the time to sample only one of the plane signals if said shortest noise pulse interval is not greater than the time to sample both an X plane signal and a Y plane signal;
sampling only one of the plane signals on each noise pulse trigger if said shortest noise pulse interval is greater than the time to sample only one of the plane signals; and
triggering said microcontroller on each occurrence of a noise pulse if said shortest noise pulse interval is not greater than the time to sample only one of the plane signals.

28. The method as claimed in claim 24 further comprising the steps of:
sampling signals from said analog to digital converter in said microcontroller;
detecting a noise signal in said sampled signals;
recording the time of arrival of each sample of noise signal;
detecting a preselected number, N, of samples of noise signal;
determining the frequency of said noise signal from said N samples of noise signal;
determining the amplitude of said noise signal from said N samples of noise signal;
determining whether said noise signal has a constant amplitude and waveshape;
sampling an X plane value and a Y plane value at the same time in a noise cycle if said noise signal has a constant amplitude and waveshape; and
sampling an X plane value and a Y plane value between noise pulses in said noise cycle if said noise signal does not have a constant amplitude and waveshape.

29. The method as claimed in claim 24 further comprising the steps of:
simultaneously sending data signals from all channels of said touch screen to a sample and hold circuit; and removing said common mode noise from said data signals by holding said data signals in said sample and hold circuit.

30. The method as claimed in claim 24 further comprising a method for reducing common mode noise in said touch screen, said method comprising the steps of:

actively sensing the ground return offset of said touch screen; and removing said ground return offset from said analog signals of said touch screen.

* * * * *